United States Patent
Maenishi et al.

(10) Patent No.: US 12,459,182 B2
(45) Date of Patent: Nov. 4, 2025

(54) RESIN FILM MANUFACTURING DEVICE AND RESIN FILM MANUFACTURING METHOD

(71) Applicant: THE JAPAN STEEL WORKS, LTD., Tokyo (JP)

(72) Inventors: Ryuichiro Maenishi, Tokyo (JP); Nobuhiro Haramoto, Tokyo (JP); Fumitake Fujii, Ube (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 393 days.

(21) Appl. No.: 17/858,178

(22) Filed: Jul. 6, 2022

(65) Prior Publication Data
US 2022/0339838 A1 Oct. 27, 2022

Related U.S. Application Data

(62) Division of application No. 16/792,259, filed on Feb. 16, 2020, now Pat. No. 11,426,914.

(30) Foreign Application Priority Data

Mar. 15, 2019 (JP) .................................. 2019-048425
Dec. 17, 2019 (JP) .................................. 2019-227255

(51) Int. Cl.
*B29C 48/08* (2019.01)
*B29C 48/31* (2019.01)
(Continued)

(52) U.S. Cl.
CPC ............ *B29C 48/08* (2019.02); *B29C 48/313* (2019.02); *B29C 48/355* (2019.02); *B29C 48/92* (2019.02); *B29C 2948/92647* (2019.02)

(58) Field of Classification Search
CPC ........ B29C 48/313; B29C 2948/92647; B29C 2948/92; B29C 48/08; B29C 48/355; B29C 48/865
See application file for complete search history.

(56) References Cited

U.S. PATENT DOCUMENTS 3,877,857 A * 4/1975 Melead ................. B29C 48/313
   425/133.5
4,514,348 A * 4/1985 Iguchi ..................... D21F 1/028
   264/408
(Continued)

FOREIGN PATENT DOCUMENTS

CN 203391271 U 1/2014
JP H01(S64)-063126 A 3/1989
(Continued)

OTHER PUBLICATIONS

Office Action issued Oct. 3, 2023, in Japanese Patent Application No. 2019-227255.
(Continued)

*Primary Examiner* — Seyed Masoud Malekzadeh
(74) *Attorney, Agent, or Firm* — Potomac Law Group, PLLC

(57) ABSTRACT

In a resin film manufacturing device according to an embodiment, a current state and a reward for a previously selected action are determined for each heat bolt based on a control error calculated from a thickness distribution of a resin film acquired from a thickness sensor. Then, control conditions, which are a combination of states and actions, are updated based on the reward, and a most appropriate action corresponding to the current state is selected from the updated control conditions. Then, the heater is controlled based on the most appropriate action.

7 Claims, 6 Drawing Sheets

(51) Int. Cl.
   *B29C 48/355* (2019.01)
   *B29C 48/92* (2019.01)

(56) References Cited

U.S. PATENT DOCUMENTS

| | | | | | |
|---|---|---|---|---|---|
| 4,517,145 | A * | 5/1985 | Knopf | ................... | B29C 48/313 |
| | | | | | 264/408 |
| 4,765,941 | A * | 8/1988 | Anthony, Jr. | ........... | B29C 48/92 |
| | | | | | 425/141 |
| 4,804,556 | A * | 2/1989 | Leffew | ..................... | G05D 5/03 |
| | | | | | 425/141 |
| 4,804,557 | A * | 2/1989 | Anthony, Jr. | ........... | B29C 48/92 |
| | | | | | 425/141 |
| 4,931,982 | A * | 6/1990 | Hayashida | ............... | G05D 5/03 |
| | | | | | 425/141 |
| 5,464,577 | A * | 11/1995 | Leonard | ................ | B05C 5/0262 |
| | | | | | 425/141 |
| 5,928,580 | A * | 7/1999 | Nitta | ........................ | B29C 48/92 |
| | | | | | 264/40.5 |
| 6,039,904 | A * | 3/2000 | Nitta | ........................ | B29C 48/08 |
| | | | | | 425/141 |
| 6,190,153 | B1 * | 2/2001 | Tsuzukiyama | ........ | B29C 55/143 |
| | | | | | 264/40.1 |
| 6,273,701 | B1 * | 8/2001 | Moriarity | ................ | B29C 48/08 |
| | | | | | 425/141 |
| 6,344,088 | B1 * | 2/2002 | Kamikihara | ............ | B29C 48/92 |
| | | | | | 118/712 |
| 6,856,855 | B2 * | 2/2005 | Hirata | ..................... | B29C 48/08 |
| | | | | | 700/196 |
| 8,105,064 | B2 * | 1/2012 | Nozawa | ................. | B29C 48/313 |
| | | | | | 425/133.5 |
| 8,246,880 | B2 * | 8/2012 | Kawabe | ................ | B29C 48/143 |
| | | | | | 264/299 |
| 8,349,228 | B2 * | 1/2013 | Kazama | ..................... | C08J 5/18 |
| | | | | | 264/237 |
| 2002/0036362 | A1 * | 3/2002 | Chigira | ............... | B29C 48/9165 |
| | | | | | 264/40.6 |
| 2002/0175434 | A1 * | 11/2002 | Uehara | ................... | B29C 48/92 |
| | | | | | 264/40.5 |
| 2003/0050717 | A1 * | 3/2003 | Hirata | ..................... | B29C 55/12 |
| | | | | | 264/239 |
| 2004/0163769 | A1 * | 8/2004 | Kegasawa | ............... | B29C 48/19 |
| | | | | | 156/497 |
| 2007/0148371 | A1 * | 6/2007 | Kazama | .................. | B29C 48/91 |
| | | | | | 428/1.31 |
| 2008/0233310 | A1 * | 9/2008 | Fujita | ................... | B29C 48/9155 |
| | | | | | 359/483.01 |
| 2009/0045536 | A1 * | 2/2009 | Terao | ...................... | B29C 48/91 |
| | | | | | 425/4 R |
| 2009/0263529 | A1 * | 10/2009 | Nozawa | ................ | B29C 48/305 |
| | | | | | 425/131.1 |
| 2010/0040806 | A1 * | 2/2010 | Suzuki | ....................... | C08J 5/18 |
| | | | | | 428/1.31 |
| 2010/0103352 | A1 * | 4/2010 | Suzuki | ..................... | C08K 5/49 |
| | | | | | 252/589 |
| 2016/0001502 | A1 * | 1/2016 | Urabe | ..................... | B32B 25/10 |
| | | | | | 156/64 |
| 2016/0038964 | A1 * | 2/2016 | Nakano | ................. | B29C 48/315 |
| | | | | | 118/125 |
| 2020/0207002 | A1 * | 7/2020 | Cloeren | ................ | B29C 48/302 |

FOREIGN PATENT DOCUMENTS

| | | |
|---|---|---|
| JP | H01-314135 A | 12/1989 |
| JP | H05-138713 A | 6/1993 |
| JP | H07-108586 A | 4/1995 |
| JP | H11-192653 A | 7/1999 |
| JP | 2002-096371 A | 4/2002 |
| JP | 2003-089146 A | 3/2003 |
| JP | 2010-167584 A | 8/2010 |
| JP | 2012-240332 A | 12/2012 |
| JP | 2013-039677 A | 2/2013 |
| JP | 2013-052574 A | 3/2013 |

OTHER PUBLICATIONS

Office Action issued Feb. 28, 2023, in Chinese Patent Application No. 202010158327.7.

Office Action issued Jan. 23, 2024, in Japanese Patent Application No. 2019-227255.

* cited by examiner

RESIN FILM MANUFACTURING DEVICE AND RESIN FILM MANUFACTURING METHOD

INCORPORATION BY REFERENCE

This application is based upon and claims the benefit of priority from Japanese patent applications No. 2019-048425 filed on Mar. 15, 2019 and No. 2019-227255 filed on Dec. 17, 2019, the disclosure of which are incorporated herein in their entirety by reference.

BACKGROUND

The present disclosure relates to a resin film manufacturing device and a resin film manufacturing method.

A resin film manufacturing device that extrudes a film-like molten resin through a gap between lips of a die attached to an extruder is known. In such a resin film manufacturing device, it is required to make the thickness uniform along the width of a resin film.

Therefore, dies disclosed in Japanese Unexamined Patent Application Publications Nos. 2010-167584, 2012-240332 and 2013-052574 include a plurality of heat bolts arranged along the long side of lips (along the width of a resin film). By individually adjusting the thermal expansion caused by a heater of each heat bolt, it is possible to locally adjust the lip gap of the die.

Further, Japanese Unexamined Patent Application Publication No. 2013-039677 discloses a resin film manufacturing device that can measure the thickness of a resin film during manufacture and perform feedback control of a lip gap of a die

SUMMARY

The present inventors have found various problems in developing a resin film manufacturing device including a die having a plurality of heat bolts and capable of feedback control of a lip gap.

The other problems and novel features of the present disclosure will become apparent from the description of this specification and the accompanying drawings.

In a resin film manufacturing device according to an embodiment, a current state and a reward for a previously selected action are determined for each heat bolt based on a control error calculated from a thickness distribution of a resin film acquired from a thickness sensor. Then, control conditions, which are a combination of states and actions, are updated based on the reward, and a most appropriate action corresponding to the current state is selected from the updated control conditions. Then, the heater is controlled based on the most appropriate action.

According to the embodiment, it is possible to provide a superior resin film manufacturing device.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments of the present disclosure will be described hereinafter in detail with reference to the drawings. The present disclosure, however, is not limited to the below-descried embodiments. The following description and the attached drawings are appropriately shortened and simplified to clarify the explanation.

First Embodiment

<Overall Structure of Resin Film Manufacturing Device>

Figure 1:
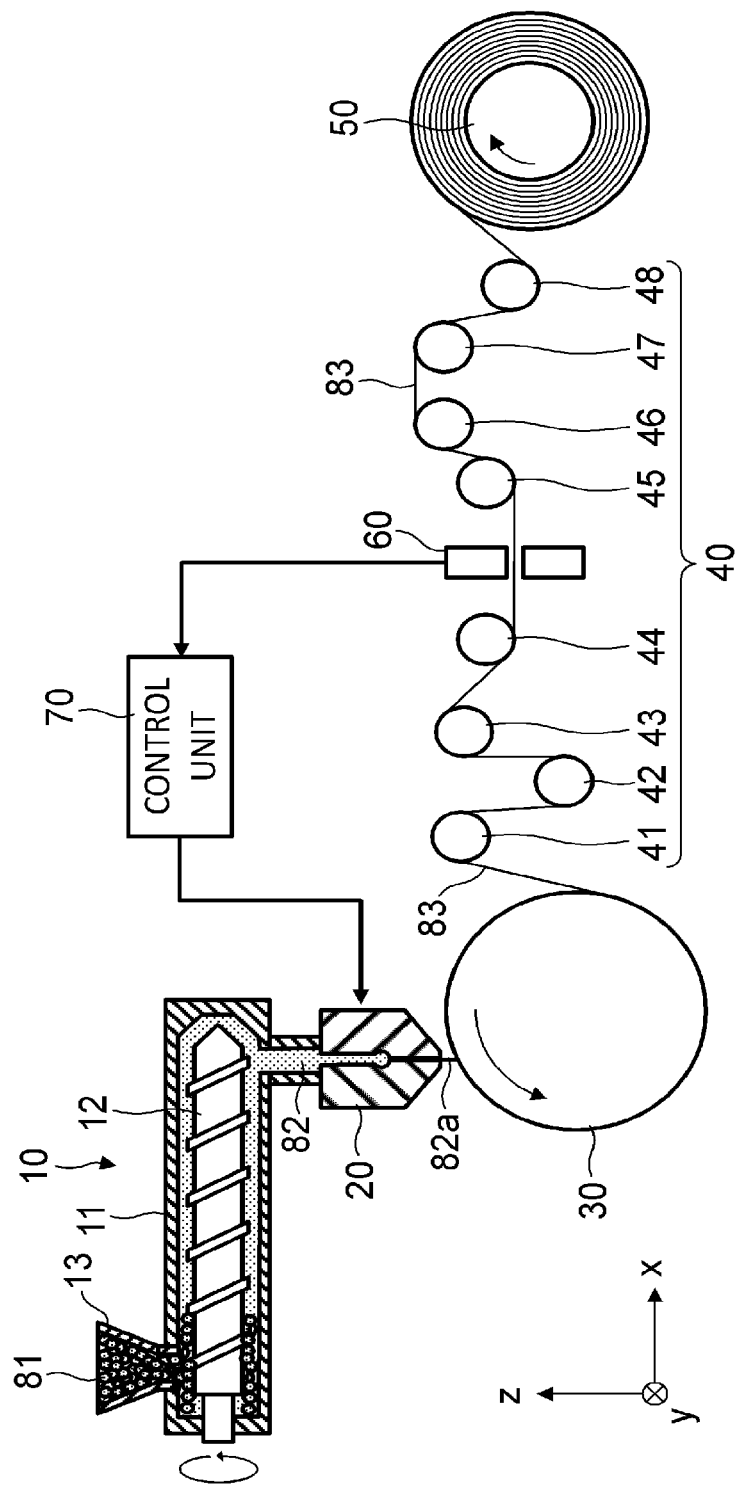
FIG. 1 is a schematic cross-sectional view showing the overall structure of the resin film manufacturing device and the resin film manufacturing method according to the first embodiment.

The overall structure of a resin film manufacturing device and a resin film manufacturing method according to a first embodiment is described first with reference to FIG. 1. FIG. 1 is a schematic cross-sectional view showing the overall structure of the resin film manufacturing device and the resin film manufacturing method according to the first embodiment.

It should be noted that the right handed xyz Cartesian coordinate system in FIG. 1 and other figures are shown for the convenience of explaining the positional relationship of elements. In general, the positive direction of the z-axis is vertically upward and the xy-plane is a horizontal plane, and they are common to all the drawings.

Further, in this specification, a resin film includes a resin sheet.

As shown in FIG. 1, the resin film manufacturing device according to the first embodiment includes an extruder 10, a T-die 20, a cooling roll 30, conveyor rolls 40, a winder 50, a thickness sensor 60, and a control unit 70. The resin film manufacturing device according to the first embodiment is a resin film manufacturing device of an extrusion molding type that extrudes a film-like molten resin 82a through a gap between lips of the T-die 20 attached to the extruder 10.

The extruder 10 is, for example, a screw extruder. In the extruder 10 shown in FIG. 1, a screw 12 placed along the x-axis is contained in a cylinder 11 placed along the x-axis. A hopper 13 in which resin pellets 81, which are the material of a resin film 83, are put is placed above the side edge of the cylinder 11 on the negative side of the x-axis.

The resin pellets 81 fed through the hopper 13 are extruded from the root to the end of the rotating screw 12, which is in the positive direction of the x-axis. The resin pellets 81 are compressed into a molten resin 82 by the rotating screw 12 inside the cylinder 11.

Note that, though not shown, for example, a motor is attached as a driving source to the screw 12 through a reducer.

As shown in FIG. 1, the T-die 20 is attached below the end (the side edge on the positive side of the x-axis) of the extruder 10. A film-like molten resin 82a is extruded downward (in the negative direction of the z-axis) through a gap between lips located at the lower end of the T-die 20. The lip gap of the T-die 20 is adjustable. To be specific, the lip gap of the T-die 20 can be adjusted at a plurality of positions along the long side (in the y-axis direction) of the lips so that the thickness along the width (in the y-axis direction) of the resin film 83 to be manufactured is uniform, as described in detail later.

The cooling roll 30 cools the film-like molten resin 82a extruded from the T-die 20 and discharges a resin film 83, which is a solidified form of the film-like molten resin 82a. The resin film 83 discharged from the cooling roll 30 is conveyed through the conveyor rolls 40 and wound up on the winder 50. In the example of FIG. 1, the conveyor rolls 40 include eight conveyor rolls 41 to 48. The number and positions of conveyor rolls are determined as appropriate.

The thickness sensor 60 is a non-contact thickness sensor, for example, and it measures the thickness distribution along the width of the resin film 83 discharged from the cooling roll 30 and being conveyed. In the example of FIG. 1, the thickness sensor 60 is placed in such a way that the resin film 83 being horizontally conveyed between the conveyor rolls 44 and 45 is interposed between the upper and lower sensor parts. Because the thickness sensor 60 is a non-contact type, it can be scanned along the width (in the y-axis direction) of the resin film 83. It is thereby possible to measure the thickness distribution along the width of the resin film 83 by using the compact thickness sensor 60. Further, because the resin film 83 is conveyed horizontally, it is possible to measure the thickness distribution accurately with scanning of the thickness sensor 60.

The control unit 70 performs feedback control of the lip gap of the T-die 20 based on the thickness distribution of the resin film 83 acquired from the thickness sensor 60. To be specific, the control unit 70 controls the lip gap of the T-die 20 so that the thickness is uniform along the width of the resin film 83. The detailed structure and operation of the control unit 70 are described later.

<Structure of T-Die 20>

Figure 2:
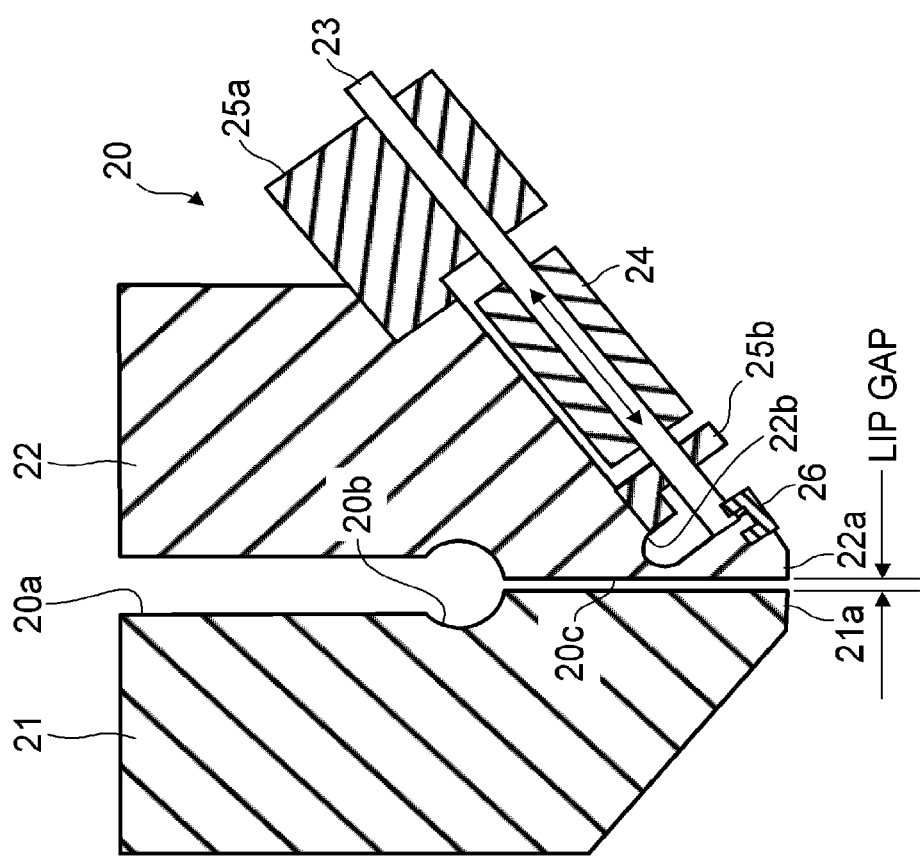
FIG. 2 is a cross-sectional view of the T-die 20.
Figure 3:
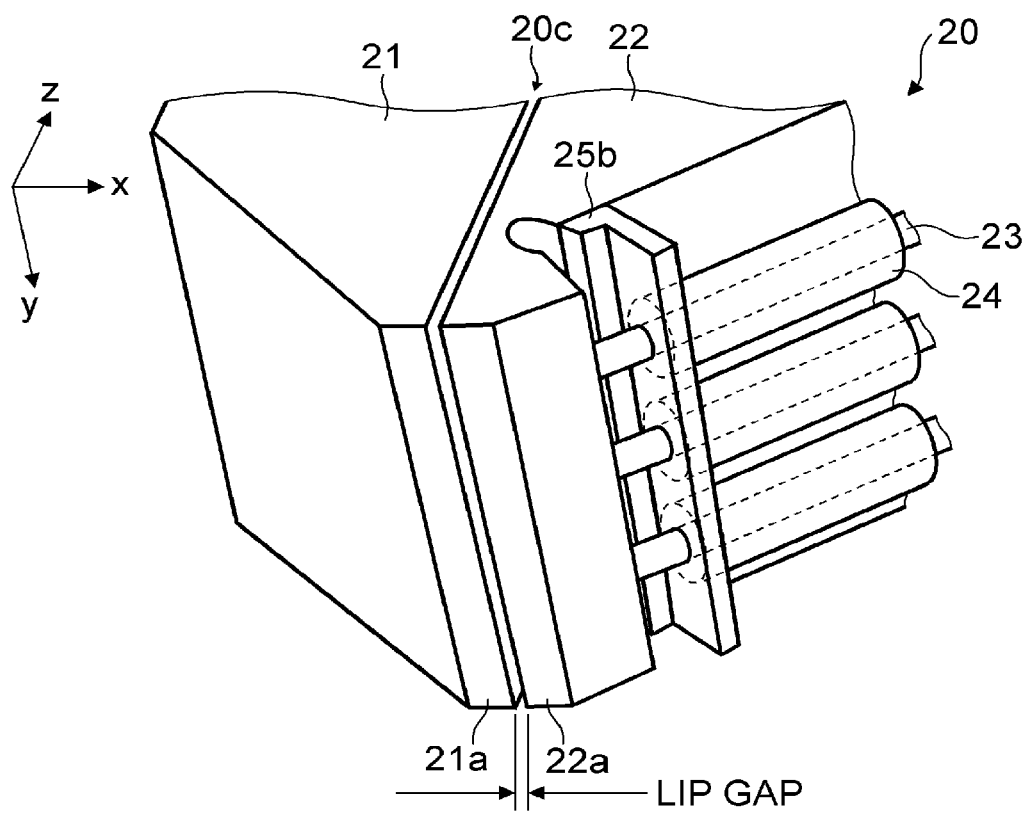
FIG. 3 is a partial perspective view of the lower part (with lips) of the T-die 20.

The structure of the T-die 20 is described in more detail with reference to FIGS. 2 and 3. FIG. 2 is a cross-sectional view of the T-die 20. FIG. 3 is a partial perspective view of the lower part (with lips) of the T-die 20.

As shown in FIGS. 2 and 3, the T-die 20 is composed of a pair of die blocks 21 and 22 butt against each other. Each of the pair of die blocks 21 and 22 butt against each other has a tapered part where the outer surface is tapered downward to the inner surface (facing surface). Thus, the die blocks 21 and 22 have thin lips 21a and 22a, respectively, at the lower ends of their facing surfaces.

The facing surfaces of the pair of die blocks 21 and 22 have a feed port 20a, a manifold 20b, and a slit 20c. The feed port 20a extends from the upper surface of the T-die 20 in the downward direction (in the negative direction of the z-axis). The manifold 20b extends from the lower end of the feed port 20a in the positive direction of the y-axis and in the negative direction of the y-axis. In this manner, the feed port 20a and the manifold 20b form a T-shape in the T-die 20.

Further, the slit 20c extends in the y-axis direction from the base of the manifold 20b to the lower surface of the T-die 20. The molten resin 82 is extruded downward from the slit 20c (i.e., the gap between the lips 21a and 22a) through the feed port 20a and the manifold 20b.

While the lip 21a is a fixed lip that is not movable, the lip 22a is a movable lip attached to a heat bolt 23. The lip 22a has a cutting groove 22b that is cut obliquely upward from the outer surface toward the facing surface. The lip 22a is pushed and pulled by the heat bolt 23 and can thereby move relative to the base of the cutting groove 22b. Because only the lip 22a is a movable lip, it is possible to easily adjust the lip gap in a simple structure.

The heat bolt 23 extends obliquely upward along the tapered part of the die block 22. The heat bolt 23 is supported by holders 25a and 25b fixed to the die block 22. To be more specific, the heat bolt 23 is screwed into a threaded hole of the holder 25a. The tightness of the heat bolt 23 can be adjusted as appropriate. While the heat bolt 23 runs through a through hole of the holder 25b, it is not fixed to the holder 25b. Note that the holders 25a and 25b are not necessarily separated from the die block 22 and may be integrated with the die block 22.

As shown in FIG. 3, a plurality of heat bolts 23 are arranged along the long side (in the y-axis direction) of the lips 21a and 22a. The long side of the lips 21a and 22a corresponds to the width direction of the resin film. Although three heat bolts 23 are shown in a schematic manner in FIG. 3, a larger number of heat bolts 23 are placed in general.

A heater 24 is placed for each of the heat bolts 23 in order to heat the heat bolt 23. In the example shown in FIGS. 2 and 3, the heater 24 is placed to cover the outer surface of the each heat bolt 23 between the holders 25a and 25b. By tightening the heat bolt 23, the lip 22a is pushed by the lower end surface of the heat bolt 23. Further, the lower end surface of the heat bolt 23 is attached to the lip 22a by an attachment 26 with a U-shaped cross section fixed to the lip 22a. Thus, by loosening the heat bolt 23, the lip 22a is pulled through the attachment 26.

The gap between the lips 21a and 22a can be adjusted by the tightness of the heat bolt 23. To be specific, when the tightness of the heat bolt 23 is increased, the heat bolt 23 pushes the lip 22a, and the gap between the lips 21a and 22a is narrowed. On the other hand, when the tightness of the heat bolt 23 is reduced, the gap between the lips 21a and 22a is widened. The tightness of the heat bolt 23 is adjusted manually, for example.

Further, the gap between the lips 21a and 22a can be finely adjusted by the thermal expansion of the heat bolt 23 caused by the heater 24. To be specific, when the heating temperature of the heater 24 is increased, the thermal expansion of the heat bolt 23 increases, and thereby the heat bolt 23 pushes the lip 22a, and the gap between the lips 21a and 22a is narrowed. On the other hand, when the heating temperature of the heater 24 is reduced, the thermal expansion of the heat bolt 23 decreases, and the gap between the lips 21a and 22a is widened. The thermal expansion of each heat bolt 23, which is the heating of each heater 24, is controlled by the control unit 70.

<Structure of Control Unit 70 According to Comparative Example>

A resin film manufacturing device according to a comparative example has the overall structure that is similar to the overall structure of the resin film manufacturing device according to the first embodiment shown in FIG. 1. In the comparative example, the control unit 70 performs feedback control of the heater 24 of each heat bolt 23 based on the thickness distribution of the resin film 83 acquired from the thickness sensor 60 by using PID control. In the PID control, it is necessary to adjust parameters each time changing process conditions. Typically, an operator adjusts parameters by trial and error, and therefore it requires a lot of time and resin material for the adjustment of parameters.

<Structure of Control Unit 70 According to First Embodiment>

Figure 4:
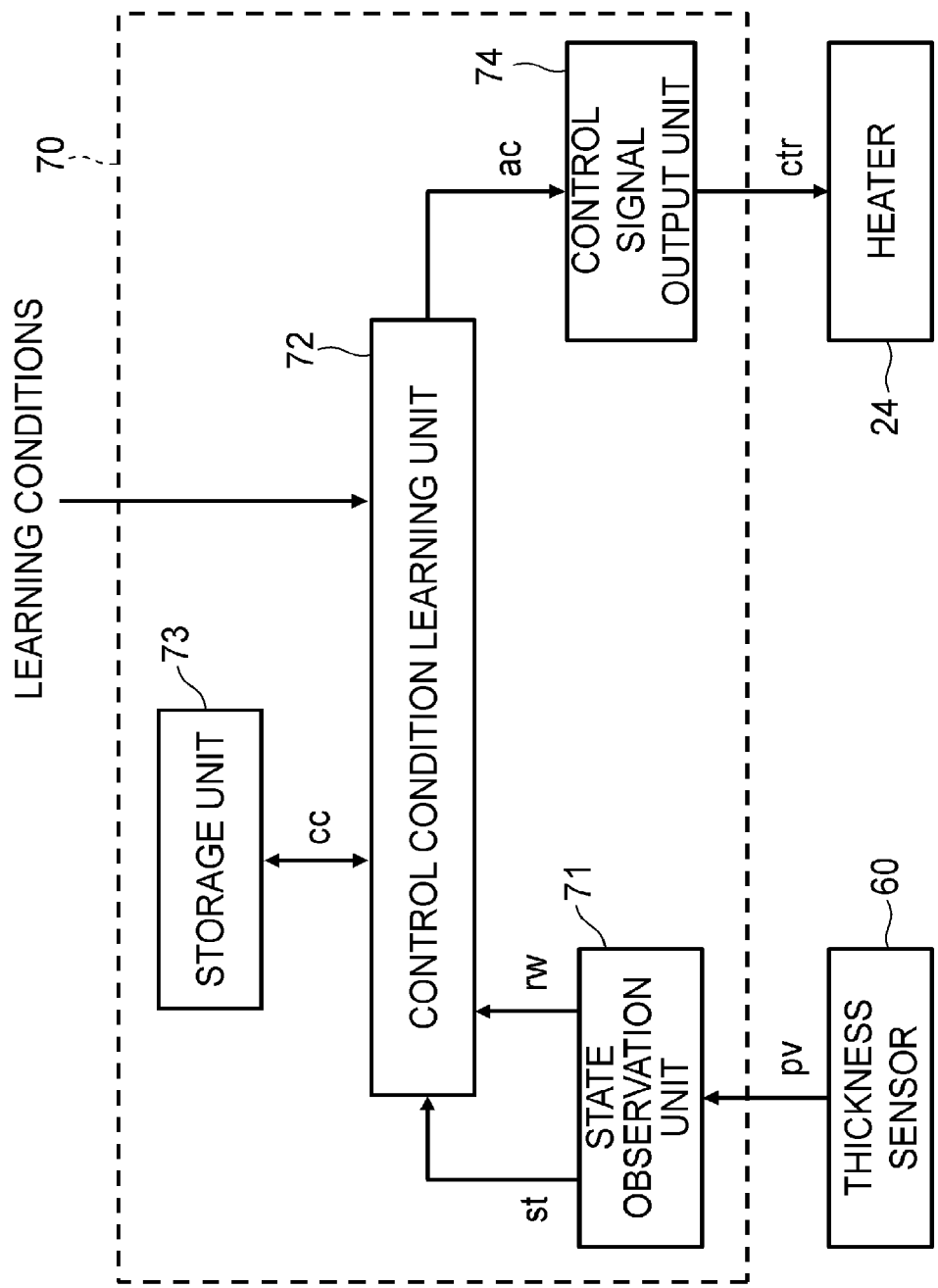
FIG. 4 is a block diagram showing the structure of the control unit 70 according to the first embodiment.

The structure of the control unit 70 according to the first embodiment is described hereinafter in more detail with reference to FIG. 4. FIG. 4 is a block diagram showing the structure of the control unit 70 according to the first embodiment. As shown in FIG. 4, the control unit 70 according to the first embodiment includes a state observation unit 71, a control condition learning unit 72, a storage unit 73, and a control signal output unit 74.

Note that the functional blocks of the control unit 70 may be configured by a CPU (Central Processing Unit), a memory or another circuit as hardware or may be implemented by a program loaded to a memory or the like as software. Thus, those functional blocks may be implemented in various forms by computer hardware, software, or a combination of those.

The state observation unit 71 calculates a control error for each heat bolt 23 from a measured value pv of the thickness distribution of the resin film 83 acquired from the thickness sensor 60. The control error is a difference between a target value and the measured value pv. The target value is the average of the measured values pv of the thickness distribution of the resin film 83 measured by the thickness sensor 60 in all heat bolts 23.

Note that, when calculating the average of the measured values pv, the measured values on the both ends of the resin film 83, which are not used as products, may be excluded.

On the other hand, the measured value pv of each heat bolt 23 is obtained from a measured thickness value pv at a measurement point assigned to each heat bolt 23. For example, the measured value pv of each heat bolt 23 is the average of the measured thickness values pv at a measurement point assigned to each heat bolt 23. Alternatively, the measured value pv of each heat bolt 23 may be the measured thickness value pv with the greatest difference from the target value at a measurement point assigned to each heat bolt 23.

Then, the state observation unit 71 determines, for each heat bolt 23, a current state st and a reward rw for an action ac selected previously (e.g., last time) based on the calculated control error.

The state st is set in advance to classify control error values, which can be infinite, into a finite number of groups. In a simple example for explanation, when a control error is err, $-0.9$ μm$\leq$err$<-0.6$ μm is a state st1, $-0.6$ μm$\leq$err$<-0.3$ μm is a state st2, $-0.3$ μm$\leq$err$<0.3$ μm is a state st3, $0.3$ μm$\leq$err$<0.6$ μm is a state st4, $0.6$ μm$\leq$err$\leq 0.9$ μm is a state st5 and the like. In practice, a larger number of more finely divided states st are set in many cases.

The reward rw is an index for evaluating the action ac selected in the previous state st.

To be specific, when the absolute value of the calculated current control error is smaller than the absolute value of the previous control error, the state observation unit 71 determines that the previously selected action ac is appropriate, and sets the reward rw to a positive value, for example. In other words, the reward rw is determined so that the previously selected action ac is likely to be selected again in the same state st as the previous time.

On the other hand, when the absolute value of the calculated current control error is larger than the absolute value of the previous control error, the state observation unit 71 determines that the previously selected action ac is not appropriate, and sets the reward rw to a negative value, for example. In other words, the reward rw is determined so that the previously selected action ac is not likely to be selected again in the same state st as the previous time.

A specific example of the reward rw is described later. The value of the reward rw can be determined as appropriate. For example, the value of the reward rw may be always positive, or the value of the reward rw may be always negative.

The control condition learning unit 72 performs reinforcement learning for each heat bolt 23. To be specific, the control condition learning unit 72 updates the control conditions (learning results) based on the reward rw and selects the most appropriate action ac corresponding to the current state st from the updated control conditions. The control conditions are a combination of the states st and the actions ac. Table 1 shows simple control conditions (learning results) corresponding to the states st1 to st5. In the example of FIG. 4, the control condition learning unit 72 stores the updated control conditions cc into the storage unit 73, which is a memory, for example, and reads the control conditions cc from the storage unit 73 and updates them.

TABLE 1

|         | st1 −0.9 to −0.6 μm | st2 −0.6 to −0.3 μm | st3 −0.3 to +0.3 μm | st4 +0.3 to +0.6 μm | st5 +0.6 to +0.9 μm |
|---------|---------------------|---------------------|---------------------|---------------------|---------------------|
| ac1 −1%   | 4.2                 | +5.3                | +3.4                | −1.2                | −3.2                |
| ac2 0%    | −1.3                | +4.3                | +3.6                | +0.1                | −1.2                |
| ac3 +1%   | −5.2                | +1.0                | +4.2                | +5.4                | +7.4                |
| ac4 +1.5% | −10.2               | −6.5                | −1.0                | +5.6                | +9.7                |

Table 1 shows control conditions (learning results) by Q-learning, which is an example of reinforcement learning. The uppermost row of Table 1 shows the above-described five states st1 to st5. Specifically, the second to sixth columns show the five states st1 to st5, respectively. On the other hand, the leftmost column of Table 1 shows four actions ac1 to ac4. Specifically, the second to fifth rows show the four actions ac1 to ac4.

In the example of Table 1, the action of reducing the output (e.g., a voltage) to the heater 24 by 1% is set as the action ac1 (output change: −1%). The action of maintaining the output to the heater 24 is set as the action ac2 (output change: 0%). The action of increasing the output to the heater 24 by 1% is set as the action ac3 (output change: +1%). The action of increasing the output to the heater 24 by 1.5% is set as the action ac4 (output change: +1.5%). The example of Table 1 is a simple example for illustration only, and, in practice, a larger number of more finely divided actions ac are set in many cases.

A value determined from a combination of the state st and the action ac in Table 1 is called a quality Q (st, ac). After an initial value is given, the quality Q is sequentially updated based on the reward rw by using a known update formula. The initial value of the quality Q is contained in the learning conditions shown in FIG. 4, for example. The learning conditions are input by an operator, for example. The initial value of the quality Q may be stored in the storage unit 73, and the past learning result may be used as the initial value, for example. Further, the learning conditions shown in FIG. 4 also contain the states st1 to st5 and the actions ac1 to ac4 shown in Table 1, for example.

The quality Q is described by using the state st4 in Table 1. In the state st4, because the control error is equal to or more than 0.3 μm and less than 0.6 μm, the lip gap in the target heat bolt 23 is too wide. Therefore, it is necessary to increase the output to the heater 24 that heats the target heat bolt 23 and thereby increase the thermal expansion of the target heat bolt 23. Thus, as a result of learning by the control condition learning unit 72, the quality Q of the actions ac3 and ac4 that increase the output to the heater 24 has increased. On the other hand, the quality Q of the action ac2 that maintains the output to the heater 24 and the action ac4 that reduces the output to the heater 24 has decreased.

In the example of Table 1, when the control error is 0.4 μm, for example, the state st is the state st4. Thus, the control condition learning unit 72 selects the most appropriate action ac4 with the highest quality Q in the state st4, and outputs it to the control signal output unit 74.

Based on the input action ac4, the control signal output unit 74 increases a control signal ctr to be output to the heater 24 by 1.5%. The control signal ctr is a voltage signal, for example.

Then, when the absolute value of the next control error is smaller than the absolute value 0.4 μm of the current control error, the state observation unit 71 determines that the selection of the action ac4 in the current state st4 is appropriate, and outputs the reward rw having a positive value. Therefore, the control condition learning unit 72 updates the control conditions to increase the quality +5.6 of the action ac4 in the state st4 in accordance with the reward rw. As a result, the control condition learning unit 72 selects the action ac4 again in the case of the state st4.

On the other hand, when the absolute value of the next control error is larger than the absolute value 0.4 μm of the current control error, the state observation unit 71 determines that the selection of the action ac4 in the current state st4 is not appropriate, and outputs the reward rw having a negative value. Therefore, the control condition learning unit 72 updates the control conditions to reduce the quality +5.6 of the action ac4 in the state st4 in accordance with the reward rw. As a result, the quality of the action ac4 in the state st4 becomes smaller than the quality +5.4 of the action ac3, and the control condition learning unit 72 selects the action ac3, instead of the action ac4, in the case of the state st4.

The timing to update the control conditions is not limited to the next time, and it may be appropriately selected in consideration of a time lag or the like. Further, in the early stage of learning, the action ac may be selected at random to accelerate the learning. Further, although reinforcement learning by simple Q-learning is described in Table 1, any learning algorithm, such as Q-learning, AC (Actor-Critic) method, TD learning or Monte-Carlo method, can be used without limitation. For example, a learning algorithm may be selected depending on circumstances, such as using the AC method when the number of states st and actions ac increases and combinatorial explosion occurs.

Further, the AC method often uses a probability distribution function as a policy function. The probability distribution function is not limited to a normal distribution function, and a sigmoid function, a softmax function or the like, for example, may be used for the purpose of simplification. The sigmoid function is a function that is used most often in a neural network. The sigmoid function can be used because the reinforcement learning is one of machine learning that is the same as the neural network. Further, the sigmoid function has an advantage that the function is simple and easy to use.

As described above, there are various learning algorithms and functions to be used, and the most suitable one for a process may be selected as appropriate.

As described in the foregoing, because the resin film manufacturing device according to the first embodiment does not use PID control, parameter adjustment involved in a change of process conditions is not needed. Further, the control unit 70 updates the control conditions (learning results) based on the reward rw by reinforcement learning, and selects the most appropriate action ac corresponding to the current state st from the updated control conditions. It is thereby possible to reduce the time and resin material required for adjustment compared with the comparative example even when process conditions are changed.

<Resin Film Manufacturing Method>

Figure 5:
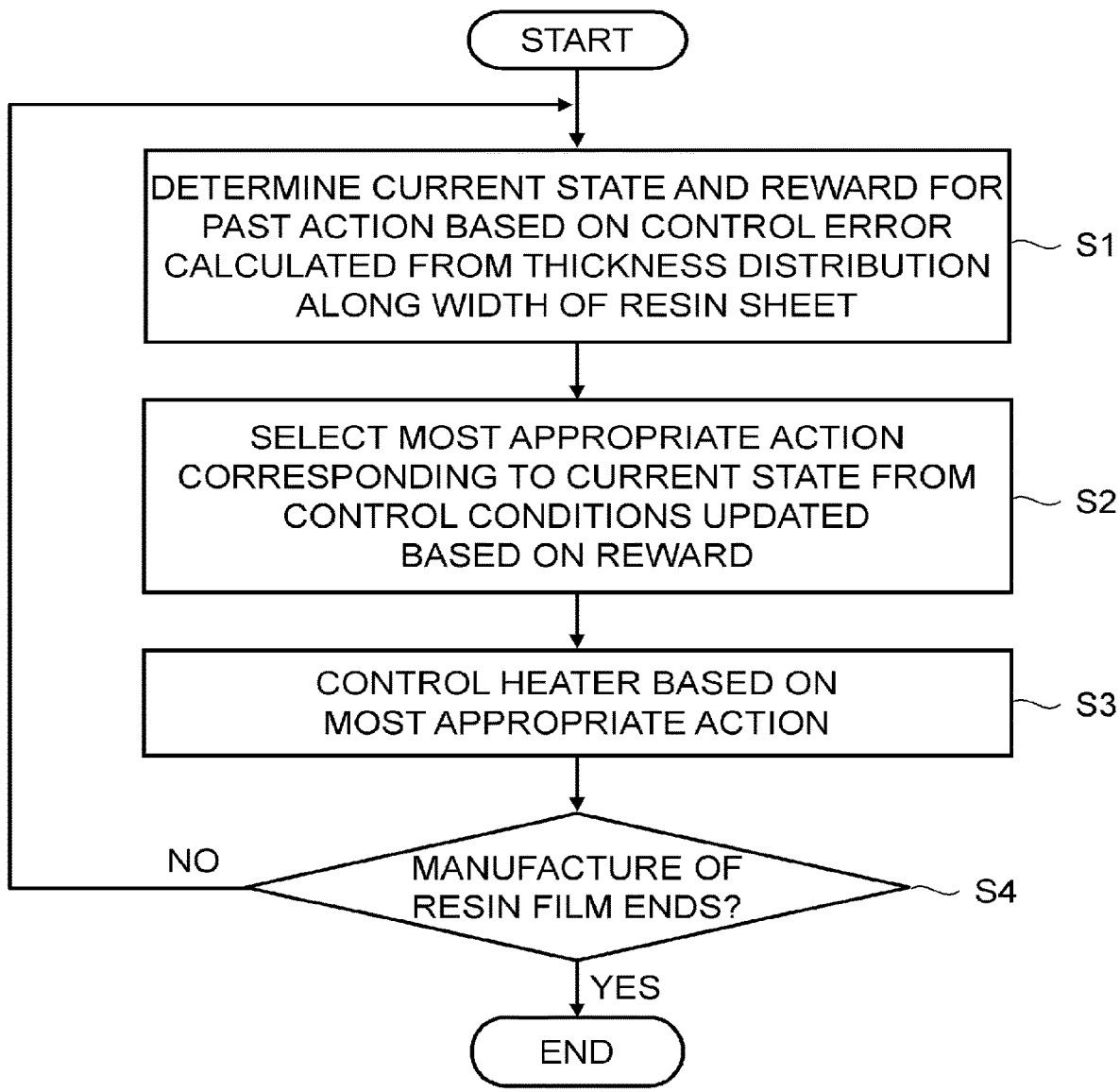
FIG. 5 is a flowchart showing a lip gap control method in the resin film manufacturing method according to the first embodiment.

A resin film manufacturing method according to the first embodiment is described hereinafter in detail with reference to FIGS. 1 and 5. FIG. 5 is a flowchart showing a lip gap control method in the resin film manufacturing method according to the first embodiment.

As shown in FIG. 1, in the resin film manufacturing method according to the first embodiment, the film-like molten resin 82*a* is extruded through a gap between the pair of lips 21*a* and 22*a* of the T-die 20.

Next, the resin film 83, which is a solidified form of the film-like molten resin 82*a*, is conveyed, and the thickness distribution along the width of the resin film 83 is measured by the thickness sensor 60.

Then, the control unit 70 performs feedback control of the lip gap based on the thickness distribution measured by the thickness sensor 60.

A lip gap control method in the resin film manufacturing method according to the first embodiment is described hereinafter with reference to FIG. 5. The description of FIG. 5 refers to FIG. 4 where needed.

First, as shown in FIG. 5, the state observation unit 71 of the control unit 70 shown in FIG. 4 calculates a control error for each heat bolt 23 from the thickness distribution of the resin film 83. Then, the current state st and the reward rw for the previously selected action ac are determined based on the calculated control error (Step S1). In the initial time, because the action ac selected previously (e.g., last time) does not exist and therefore the reward rw cannot be determined, only the current state st is determined.

Next, the control condition learning unit 72 of the control unit 70 updates the control conditions, which are a combination of the states st and the actions ac, based on the reward rw. Then, the most appropriate action ac corresponding to the current state st is selected from the updated control conditions (Step S2).

After that, the control signal output unit 74 of the control unit 70 outputs a control signal ctr to the heater 24 based on the most appropriate action ac selected by the control condition learning unit 72 (Step S3).

When the manufacture of the resin film 83 has not ended (No in Step S4), the process returns to Step S1 and continues the control. On the other hand, when the manufacture of the resin film 83 has ended (Yes in Step S4), the process ends the control. Thus, Steps S1 to S3 are repeated until the manufacture of the resin film 83 ends.

As described above, because the resin film manufacturing method according to the first embodiment does not use PID control, parameter adjustment involved in a change of process conditions is not needed. Further, this method updates the control conditions (learning results) based on the reward rw by reinforcement learning using a computer, and selects the most appropriate action ac corresponding to the current state st from the updated control conditions. It is thereby possible to reduce the time and resin material required for adjustment compared with the comparative example even when process conditions are changed.

Second Embodiment

A resin film manufacturing device according to a second embodiment is described hereinafter. The overall structure of the resin film manufacturing device according to the second embodiment is the same as the overall structure of the resin film manufacturing device according to the first embodiment shown in FIGS. 1 to 3, and the description thereof is omitted. The resin film manufacturing device according to the second embodiment is different from the resin film manufacturing device according to the first embodiment in the structure of the control unit 70.

Figure 6:
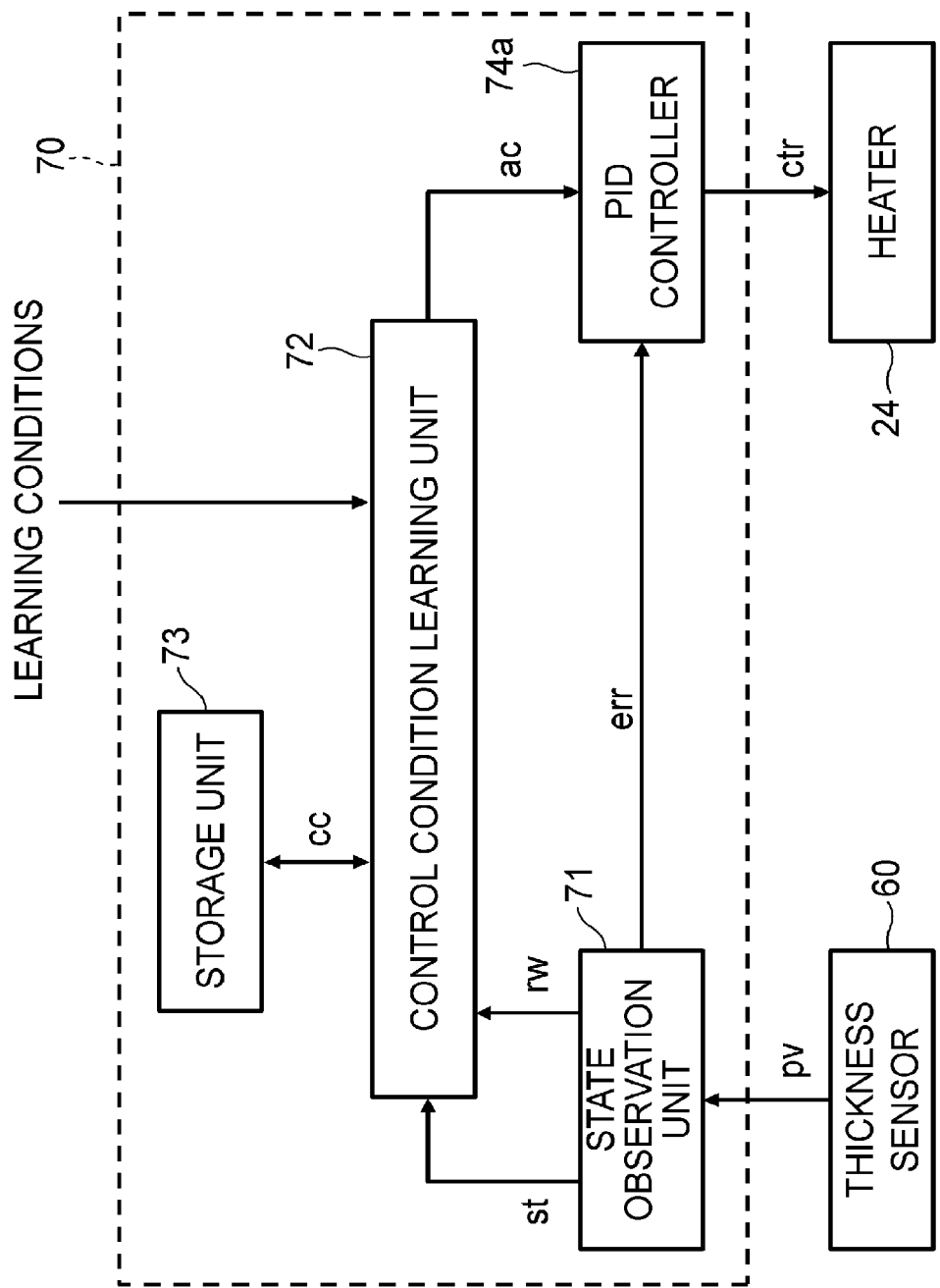
FIG. 6 is a block diagram showing the structure of the control unit 70 according to the second embodiment.

FIG. 6 is a block diagram showing the structure of the control unit 70 according to the second embodiment. As shown in FIG. 6, the control unit 70 according to the second embodiment includes a state observation unit 71, a control condition learning unit 72, a storage unit 73, and a PID controller 74a. Thus, the control unit 70 according to the second embodiment includes the PID controller 74a as the control signal output unit 74 in the control unit 70 according to the first embodiment shown in FIG. 4. The PID controller 74a is one form of the control signal output unit.

The state observation unit 71 determines, for each heat bolt 23, the current state st and the reward rw for the previously selected action ac based on the calculated control error err, just like in the first embodiment. Then, the state observation unit 71 outputs the current state st and the reward rw to the control condition learning unit 72. Further, the state observation unit 71 according to the second embodiment outputs the calculated control error err to the PID controller 74a.

The control condition learning unit 72 also performs reinforcement learning for each heat bolt 23, just like in the first embodiment. To be specific, the control condition learning unit 72 updates the control conditions (learning results) based on the reward rw and selects the most appropriate action ac corresponding to the current state st from the updated control conditions. In the first embodiment, the content of the action ac selected by the control condition learning unit 72 is a direct change of the output to the heater 24. On the other hand, in the second embodiment, the content of the action ac selected by the control condition learning unit 72 is a change of a parameter of the PID controller 74a.

As shown in FIG. 6, the parameter of the PID controller 74a is sequentially changed based on the action ac output from the control condition learning unit 72. The PID controller 74a outputs the control signal ctr to the heater 24 based on the input control error err. The control signal ctr is a voltage signal, for example.

The other elements are the same as those of the first embodiment, and the description thereof is omitted.

As described above, because the resin film manufacturing device according to the second embodiment uses PID control, parameter adjustment involved in a change of process conditions is needed. In the resin film manufacturing device according to the second embodiment, the control unit 70 updates the control conditions (learning results) based on the reward rw by reinforcement learning, and selects the most appropriate action ac corresponding to the current state st from the updated control conditions. The action ac in reinforcement learning is a change of the parameter of the PID controller 74a. It is thereby possible to reduce the time and resin material required for parameter adjustment compared with the comparative example even when process conditions are changed.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A resin film manufacturing method comprising steps of:
   (a) extruding a molten resin from a gap between a pair of lips of a die, the die including a plurality of pairs of heat bolts arranged along a longer side of the pair of lips, and heaters for heating the heat bolts, being configured to be adjusted a lip gap for each of the heat bolts;
   (b) conveying a resin film and measuring a thickness distribution along a width of the resin film, the resin film being a solidified form of the molten resin;
   (c) calculating a control error from the measured thickness distribution, the control error representing a difference between a thickness distribution target value and the measured thickness distribution; and
   (d) for each heat bolt, performing feedback control of the lip gap by:
   (d1) determining a current state and a reward based on the control error calculated from the thickness distribution, a state representing a predetermined control error range, wherein
      the determining of the current state includes determining in which one of a plurality of predetermined control error ranges does the calculated control error fall into, and
      the determining of the reward includes determining whether an action selected in a state previous to the current state is an appropriate action for the current state, wherein
      the action is determined to be an appropriate action when an absolute value of the calculated control error is smaller than an absolute value of a control error calculated for a state previous to the current state, and an action is determined to not be appropriate when the absolute value of the calculated control error is larger than the absolute value of the control error calculated for the state previous to the current state,
   (d2) updating control conditions based on the determined reward and selecting an action corresponding to the current state from the updated control conditions, the control conditions being a combination of states and actions, and
   (d3) controlling a corresponding heater based on the selected action corresponding to the current state from the updated control conditions.

2. The resin film manufacturing method according to claim 1, wherein the action determined in the step (d2) is a change of output of the corresponding heater.

3. The resin film manufacturing method according to claim 1, wherein the selected action determined in the step (d2) is a change of a parameter of a controller that controls output of the corresponding heater.

4. The resin film manufacturing method according to claim 1, wherein, in the step (b), the thickness distribution along the width of the resin film is measured by a non-contact thickness sensor.

5. The resin film manufacturing method according to claim 4, wherein the thickness sensor is scanned along the width of the resin film.

6. The resin film manufacturing method according to claim 5, wherein the thickness distribution along the width of the resin film conveyed horizontally is measured by the thickness sensor.

7. The resin film manufacturing method according to claim 1, wherein only one of the plurality of the pair of lips is attached to the heat bolts.

* * * * *